3,154,794
FLUSH VALVE
Armand E. Antunez, Jr., 20123 E. Sierra Madre Ave., Glendora, Calif.
Filed Feb. 25, 1963, Ser. No. 260,569
1 Claim. (Cl. 4—57)

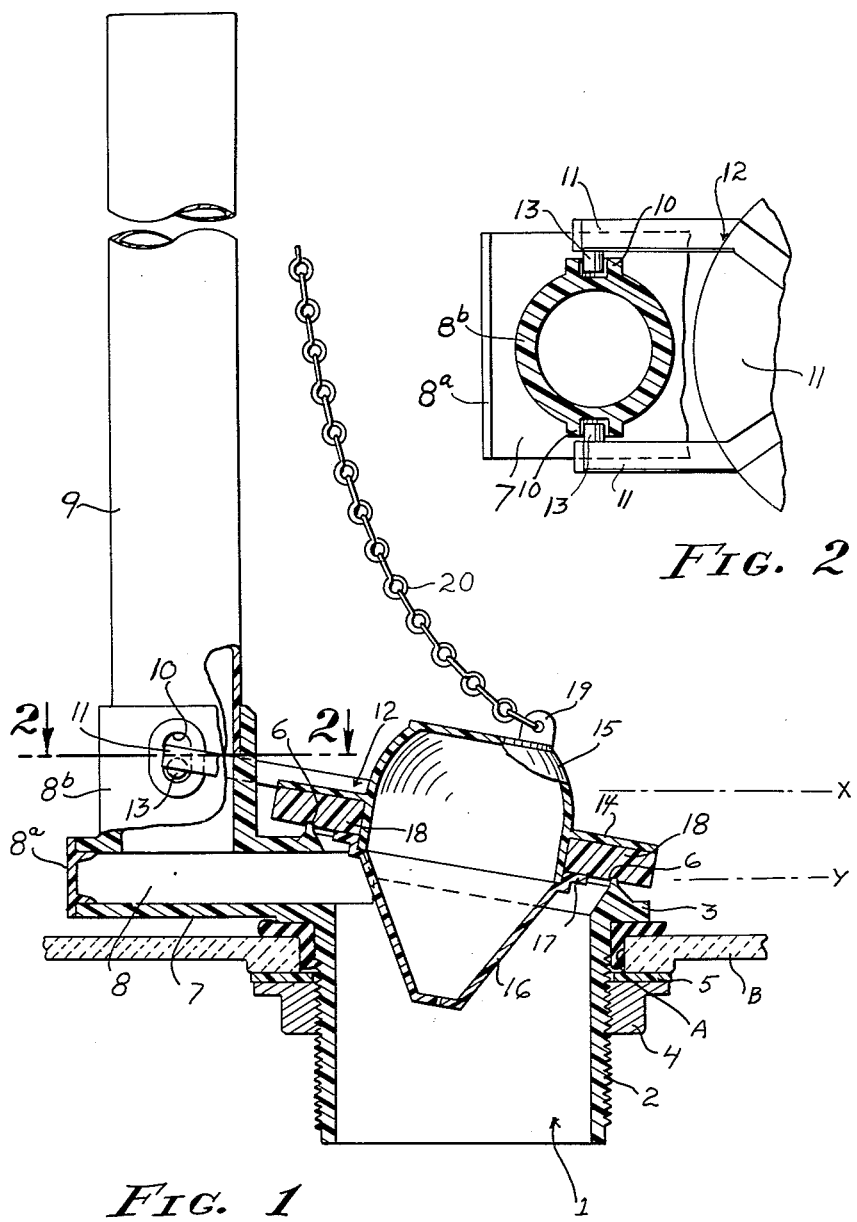

This invention relates to flush valve, and included in the objects of this invention are:

First, to provide a particularly simple and effective flush valve for toilets which is particularly adapted for manufacture from plastic materials, which may be joined by cement, thus reducing the cost of manufacture and the labor of assembly.

Second, to provide a flush valve which is so arranged as to drain the maximum amount of water from a flush tank, leaving only a minimum layer of water in the bottom of the tank.

Third, to provide a flush valve which utilizes a novel seal disk and set capable, in response to an extremely low head of water, to form a fluid-tight seal with the valve seat.

Fourth, to provide a flush valve which utilizes a float element of light weight construction tending, on opening of the flush valve, to lift the flush valve clear of the valve seat; and which, as the water level of the flush tank recedes, gradually lowers the valve sealing disk to its closed position, without,, however, permitting the valve to close fully until all the water above the valve seat has been drained.

With the above and other objects in view, as may appear hereinafter, reference is directed to the accompanying drawings in which:

FIGURE 1 is a fragmentary, partial side view, partial sectional view showing by solid lines the flush valve in its closed position.

FIGURE 2 is a fragmentary, sectional view taken through 2—2 of FIGURE 1.

The flush valve includes a tubular fitting 1 molded of plastic material having external screw threads 2 adapted to extend through the standard drain opening A provided in a toilet flush tank B. The fitting 1 is provided with an external flange 3 which seats on the bottom of the flush tank. A nut 4 and washers 5 secure and seal the fitting 1 with respect to the flush tank B.

The upper end of the tubular fitting 1 is flared outwardly to form a valve seat 6 which defines a plane at an acute angle to the bottom of the flush tank B so that one margin of the valve seat 6 is as close as possible to the bottom of the flush tank.

Extending from the tubular fitting 1 under the opposite or raised side of the valve seat 6 is an integral lateral boss 7 having a passage 8 intersecting the bore of the fitting 1 below the valve seat 6 and receiving a cover plate 8a cemented in its extended end. Extending upwardly from the boss 7 is an integral drain tube boss 8b having an axis in parallel offset relation with the fitting 1. The boss is adapted to receive a plastic drain tube 9 which is cemented in place.

Located on opposite sides of the boss 8b a short distance above the lower end of the drain tube 9 are lateral journal rings 10 which receive the bifurcated end 11 of a yoke lever 12, also formed of plastic material. The bifurcated end 11 is provided with inturned pivot lugs 13 which journal loosely in the rings 10.

The yoke lever 12 extends over the valve seat 6, and supported from its underside is a flange 14 surrounding an inverted cup 15. Cemented to the rim of the cup 15 is a depending conical extension 16 having a flange 17. The cup and cone form a lightweight float. Fitted between the flanges 14 and 17 is a seal ring 18.

The seal ring 18 is formed of extremely soft rubber or other elastomer. The seal ring 18 is relatively thick, and its surface is quite yieldable so that it readily accommodates and conforms itself to the valve seat 6.

The float and lever 12 are so mounted that when the seal ring 18 rotates into contact with the valve seat 6 its under surface coincides with the inclined plane of the valve seat 6 for sealing engagement therewith.

The upper or closed side of the cup 15 is provided with a lug 19 which receives a rod or chain 20 for attachment to a conventional flushing lever (not shown) for lifting the valve from its seat.

Operation of the flush valve is as follows:

When the flush tank B is filled with water the seal ring 18, float and yoke lever 12 are in the position shown by solid lines in FIGURE 1, and the force exerted by the head of water in the tank B presses the seal ring 18 firmly against the valve seat 6.

The tank B is flushed by an upward pull on the lifting rod or chain 20. On being lifted upwardly, the float becomes immersed in the water and, being hollow and buoyant, floats upwardly clear of the discharge opening and stays in this position until the water level in the tank B has reached the approximate level indicated by X in FIGURE 1. As the water continues to recede, the float 14 moves downwardly until the water reaches a level Y at the lower margin of the valve seat 6.

The yoke lever 12 and float are formed of a lightweight plastic material and the seal ring 18 is also lightweight, so that their combined weight is insufficient, of itself, to insure a seal. As a consequence, the maximum amount of water is drained virtually to the level of the lower margin of the valve seat 6.

The rate at which water is supplied by the conventional ball cock to the flush tank is substantially faster than the leakage of any water under the seal ring 18 after the seal ring actually engages the valve seat 6; and although initial leakage of the seal ring 18 occurs, this is soon stopped when the head of water has reached 1" or less in the tank. This is due to the fact that the use of a soft elastomer enables the surface of the seal ring 18 to yield under very slight force and form a dependable seal with the valve seat 6. As the water level in the flush tank raises, the sealing pressure increases.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:

A flush valve comprising:

(a) a body structure formed of plastic material and including a vertical portion having at its upper end an inclined valve seat and forming thereunder a vertical drain passage, a lateral portion defining a radial passage communicating with said drain passage, and an upstanding tubular boss on said lateral portion defining diametrically disposed journal recesses;

(b) a hollow float structure including complementary upper and lower cup-shaped plastic members cemented together at their rims, the upper cup member having a flange of greater diameter than said valve seat, the lower cup member having a flange of lesser diameter;

(c) a seal ring disposed between and retained by said flanges, said seal ring being formed of a soft elastomer whereby said seal ring readily conforms to said valve seat and being at least as large as said seat;

(d) and a pair of arms integral with said upper cup member and its flange, said arms extending laterally and terminating in inturned pivot elements of smaller diameter than said journal recesses and fitting loosely therein, said arms having limited yieldability to permit spreading for insertion of said pivot elements into said journal recesses, said arms positioning said float for movement to place said seal ring in engagement with said seat.

References Cited in the file of this patent

UNITED STATES PATENTS

| | | |
|---|---|---|
| 419,566 | Scott | Jan. 14, 1890 |
| 2,689,352 | Pegler | Sept. 21, 1954 |
| 2,767,406 | Bennett | Oct. 23, 1956 |
| 2,970,319 | Lassiter | Feb. 7, 1961 |
| 3,076,974 | Sorensen | Feb. 12, 1963 |